Figure 1:
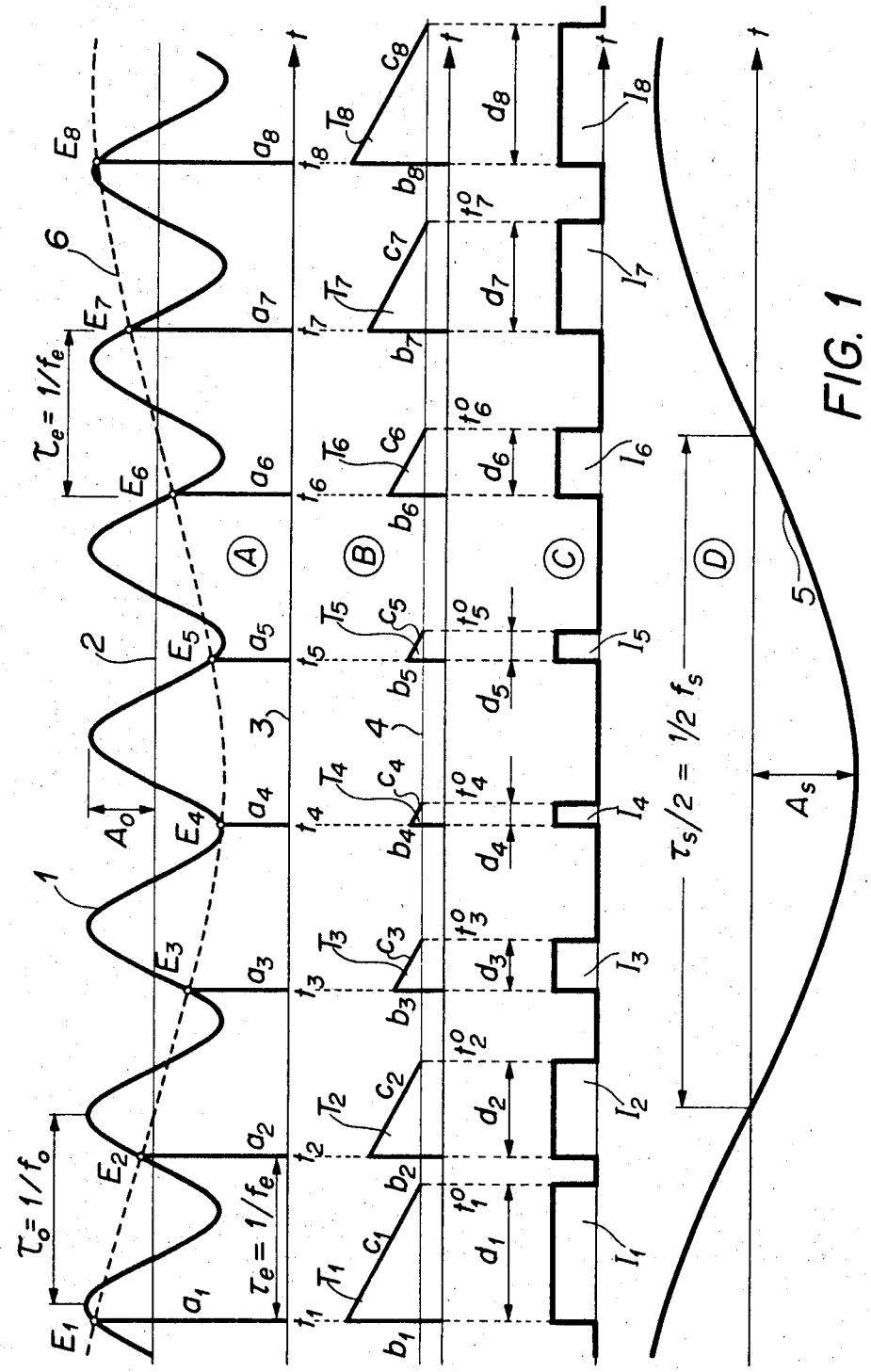

United States Patent

[11] 3,603,867

[72] Inventor Gerard Cuenoud
Grand-Lancy/Geneva, Switzerland
[21] Appl. No. 44,783
[22] Filed June 9, 1970
[45] Patented Sept. 7, 1971
[73] Assignee Battelle Memorial Institute
Carouge/Geneva, Switzerland
[32] Priority June 9, 1969
[33] Switzerland
[31] 8769/69

[54] METHOD OF CONTROLLING A POLYPHASE INVERTER
11 Claims, 8 Drawing Figs.

[52] U.S. Cl. .................................................. 321/61,
321/5, 321/69 R
[51] Int. Cl. .................................................. H02m 5/30
[50] Field of Search .................................. 307/252 N,
252 Q; 321/5, 61, 69

[56] References Cited
UNITED STATES PATENTS
3,152,297 10/1964 Peaslee .......................... 321/61

| 3,214,672 | 10/1965 | Watkins ........................ | 321/69 X |
| 3,246,231 | 4/1966 | Clarke .......................... | 321/61 X |
| 3,360,709 | 12/1967 | Etter ............................ | 321/5 |

*Primary Examiner*—William M. Shoop, Jr.
*Attorney*—Waters, Roditi, Schwartz & Nissen

ABSTRACT: A method of controlling a polyphase inverter intended to supply a polyphase voltage whose frequency and amplitude must be variable independently. A sine wave of fixed frequency is generated and is sampled at a succession of instants at a frequency close to that of the sine wave. From this sampling is obtained a train of width-modulated pulses whose width corresponds to the amplitude of the sine wave at the successive sampling instants. Any variation in frequency of the sampling results in a corresponding variation in frequency of the pulse train and any variation in amplitude of the sine wave correspondingly affects the width of the pulses. As many such pulse trains as there are phases are produced and the leading and trailing edges of the pulses, which are independently variable by virtue of the sampling frequency and the amplitude of the sine wave being independent, are used to control the firing and extinction of rectifier elements in the inverter.

METHOD OF CONTROLLING A POLYPHASE INVERTER

The present invention concerns a method of controlling a polyphase inverter intended to supply a polyphase voltage whose frequency and amplitude must be variable at will independently of one another and comprising a number of switching groups equal to the number of phases of the said polyphase voltage, by means of signals controlling the firing and extinction of the rectifier elements of each of these switching groups.

The problem of controlling a polyphase inverter is not new and many methods have been proposed for this purpose. When the voltage which is to be supplied by the inverter has a fixed value and possesses a simple nonsinusoidal form (for example square) at fixed frequency, the problem does not present any particular difficulty. The same is not the case when this voltage is sinusoidal and when its amplitude and its frequency must be variable at will, as is the case when the inverter is to drive an asynchronous motor at variable speed. In this case, it is necessary to solve the problem of generating the control signals which govern the forced firing and extinction of the rectifier elements present in the inverter, which signals must succeed one another in accordance with the laws which must be satisfied for the voltage and frequency variations.

One method consists in comparing the momentary value of the output current supplied by one of the phases of the inverter with the monetary value of a sinusoidal current of high frequency, in generating pulses which succeed one another at a high frequency differing slightly from that of the sinusoidal current, and of directing these pulses, as a function of the result of the comparison, to one or other of the two rectifier elements of the switching group allocated to the corresponding phase in such manner as to produce the extinction of one or other of the said rectifier elements, in order to compensate for the difference between the momentary value of the output current and that of the sinusoidal current. This tends to cause the output current to follow the momentary value possessed by the high-frequency sinusoidal current at the instants when the pulses are set up, since these momentary values vary sinusoidally at a low frequency which, as in a beat phenomenon, is equal to the difference between the frequency of the sinusoidal current and that of the pulses. Each of the switching groups is similarly controlled, the pulse trains allocated to the various phases being offset from one another by that fraction of a period which corresponds to the number of phases of the inverter (for example one-third in the case of a three-phase inverter). By modifying one or other of the frequencies (preferably that of the pulses) it is possible to vary at will the frequency of the current supplied by the inverter, and by modifying the amplitude of the sinusoidal current it is possible to vary at will that of the current supplied. It will be seen that this solution consists in effecting a kind of sampling, at the repetition rate of the pulses, of the result of the comparison between the sinusoidal current and the current supplied. It therefore necessitates, for each phase, a feedback line which connects the output of the inverter to the input of the control circuit, which is attended by disadvantages, notably in regard to the rapidity of the measurement.

Another solution, called the "suboscillation method" by some authors, consists in generating a sinusoidal reference signal whose frequency is equal to the output frequency, in superimposing upon this reference signal a periodic auxiliary signal of triangular or sawtooth form, and in controlling the firing or extinction of the rectifier elements of the inverter at the instants when the difference between the reference signal and the auxiliary signal changes sign. This therefore necessitates the generation of a low-frequency sinusoidal signal, generally of polyphase form, which constitutes in a manner of speaking the "pattern" of the current which is to be supplied by the inverter. If it is necessary to be able to vary the frequency and the amplitude of the latter, it must therefore be ensured that the frequency and the amplitude of the reference signal are variable, which cannot be done without some difficulty, especially if the frequency range to be covered is wide and if it includes zero frequency. Although it is not attended by the disadvantage of necessitating a feedback line between the output of the inverter and the control circuits of each phase, this solution nevertheless remains complicated owing to the fact that a polyphase low-frequency generator having variable amplitude and frequency must be provided.

The invention relates to a method of obviating the disadvantages of both the aforesaid solutions.

According to one aspect of the present invention there is provided a method of controlling a polyphase inverter intended to supply a polyphase voltage whose frequency and amplitude are adjustable independently of one another, said inverter comprising a number of switching groups equal to the number of phases of said polyphase voltage, and said switching groups comprising rectifier elements whose firing and extinction are cyclically triggered by external control signals, the method comprising a. generating at least one sinusoidal voltage wave whose frequency ($f_o$) is fixed and whose amplitude ($A_o$) can vary between zero and a maximum value, b. sampling this sinusoidal wave by measuring its momentary value at sampling instants which succeed one another within at least one train whose frequency can vary about a value close to the fixed frequency of said sinusoidal wave, this measurement being made in relation to a first fixed reference level which is so chosen that the momentary value of this sinusoidal wave measured in relation to the said level is always different from zero, c. converting this momentary value into a pulse duration by generating a succession of asymmetrical triangular signals whose steep edges precede the oblique edges and coincide with these sampling values, the height of these steep edges being proportional to said momentary value of the said sinusoidal voltage and the slope of these oblique edges having a predetermined value, and by generating rectangular pulses whose height is fixed and whose width is equal to the period elapsing between the appearance of the said steep edge and the instant when the said oblique edge reaches a second reference level, the succession of these pulses constituting a set of rectangular waves which are equal in number to the switching groups of said inverter, which have the same frequency as said sampling train and which are width-modulated, the variation of this width being proportional to the momentary value of the said sinusoidal voltage, and d. allocating one of said rectangular waves to each of the switching groups of the said inverter, the leading and trailing edges of the pulses of said rectangular waves being utilized to form said control signals, so that the voltage across the terminals of each of said switching groups is a pulsating voltage whose mean value oscillates in accordance with a sinusoidal law, whose frequency is equal to the absolute value of the difference between the fixed frequency of said sinusoidal wave and the variable frequency of the said succession of sampling instants, and the amplitude of which is proportional to the variable amplitude of said sinusoidal voltage wave.

The invention also relates to an apparatus for carrying out the above method. According to this aspect of the invention, the apparatus comprises a set of driving circuits equal in number to the phases of said inverter and each of which is allocated to one of the switching groups of said inverter, each of these driving circuits comprising:

a sampling circuit provided with a main input for connection to a first external generator capable of supplying at least one sinusoidal voltage wave whose frequency is fixed and whose amplitude can vary between zero and a maximum value, with a control input for connection to a second external generator capable of supplying at least one train of periodic pulses whose amplitude if fixed and whose frequency can vary about a value equal to the frequency of said sinusoidal voltage wave, and with an output, said sampling circuit comprising a chopper-amplifier whose input is connected at least indirectly to the said main input and, in use, is brought to a fixed voltage constituting said first reference level, whose output is connected through a unidirectional rectifier element to said output, and whose triggering member is connected at least indirectly to the said control input, a measuring capacitor connected between the output of said sampling circuit and a first fixed reference voltage, a constant-rate discharge circuit connected to the terminals of said capacitor, and a comparator circuit provided with two inputs and one output, one of said inputs being connected to the output of the said sampling circuit, and the other input being, in use, brought to a second voltage, having the same polarity as the first and constituting the said second reference value, and this output, which constitutes the output of the said driving circuit, being for connection to a grid circuit attached to the corresponding switching group of said inverter, the whole arrangement being such that each of the said driving circuits supplies control signals formed of a succession of rectangular pulses, each of which has its positive-going edge coinciding with one of the pulses of the train of pulses supplied by said second generator.

Figure 2:
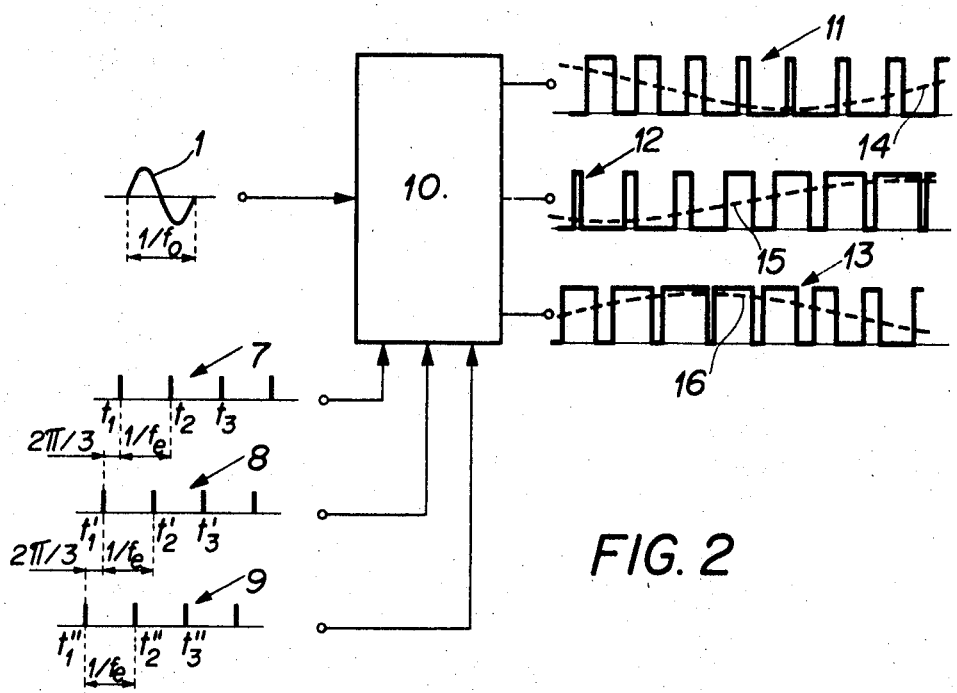
Figure 3:
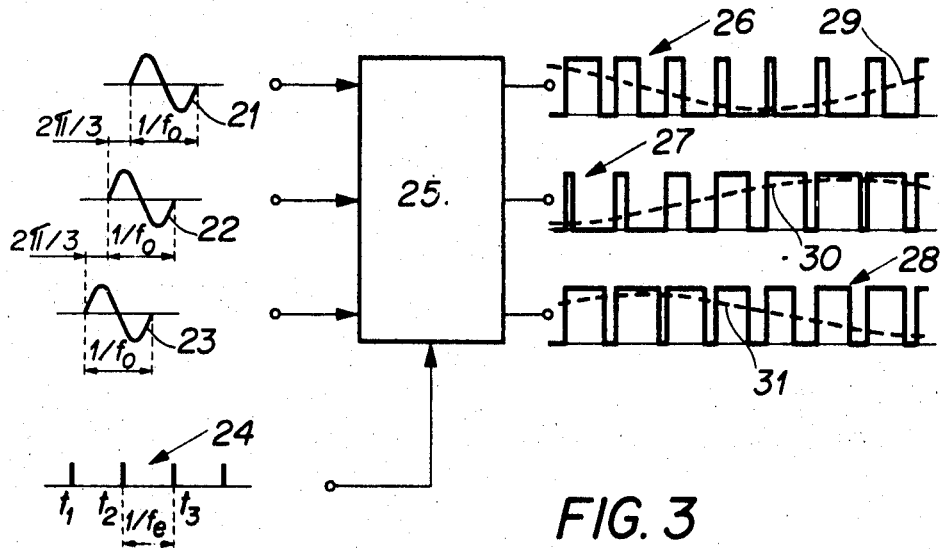
Figure 4:
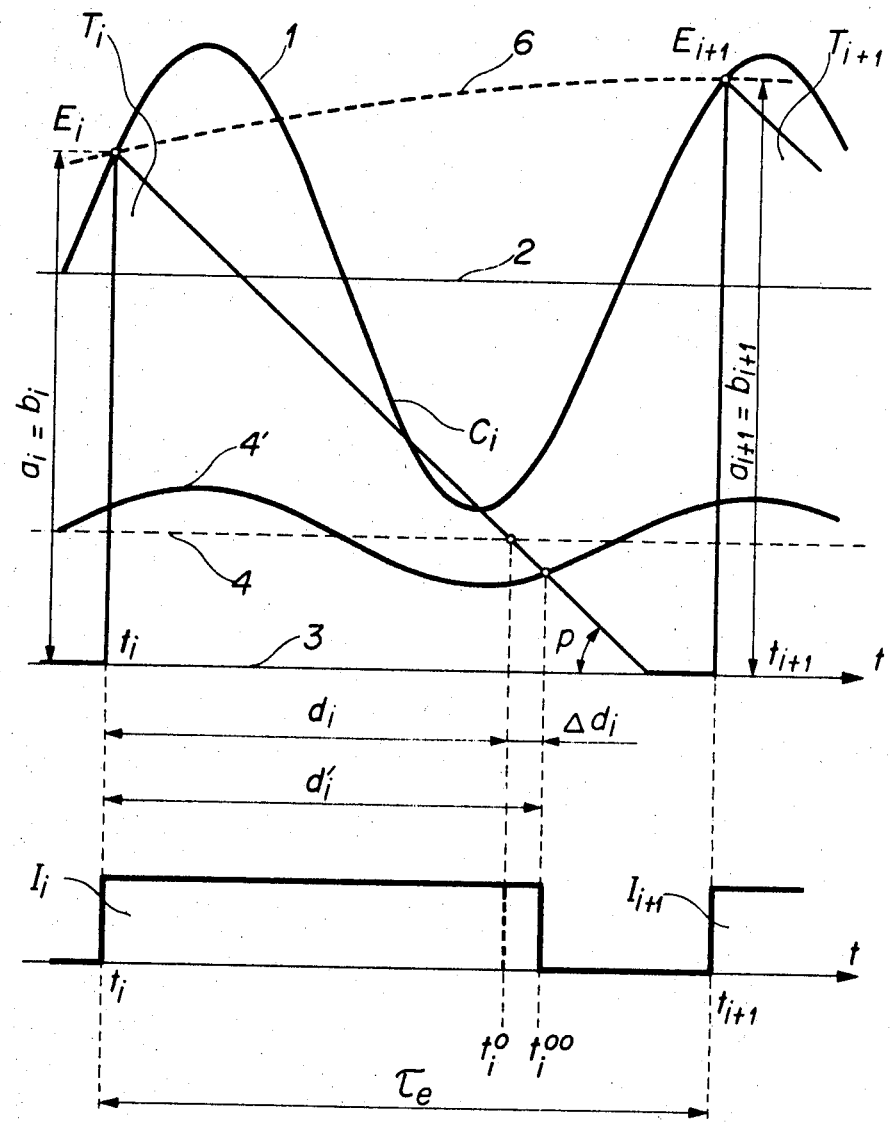
Figure 5:
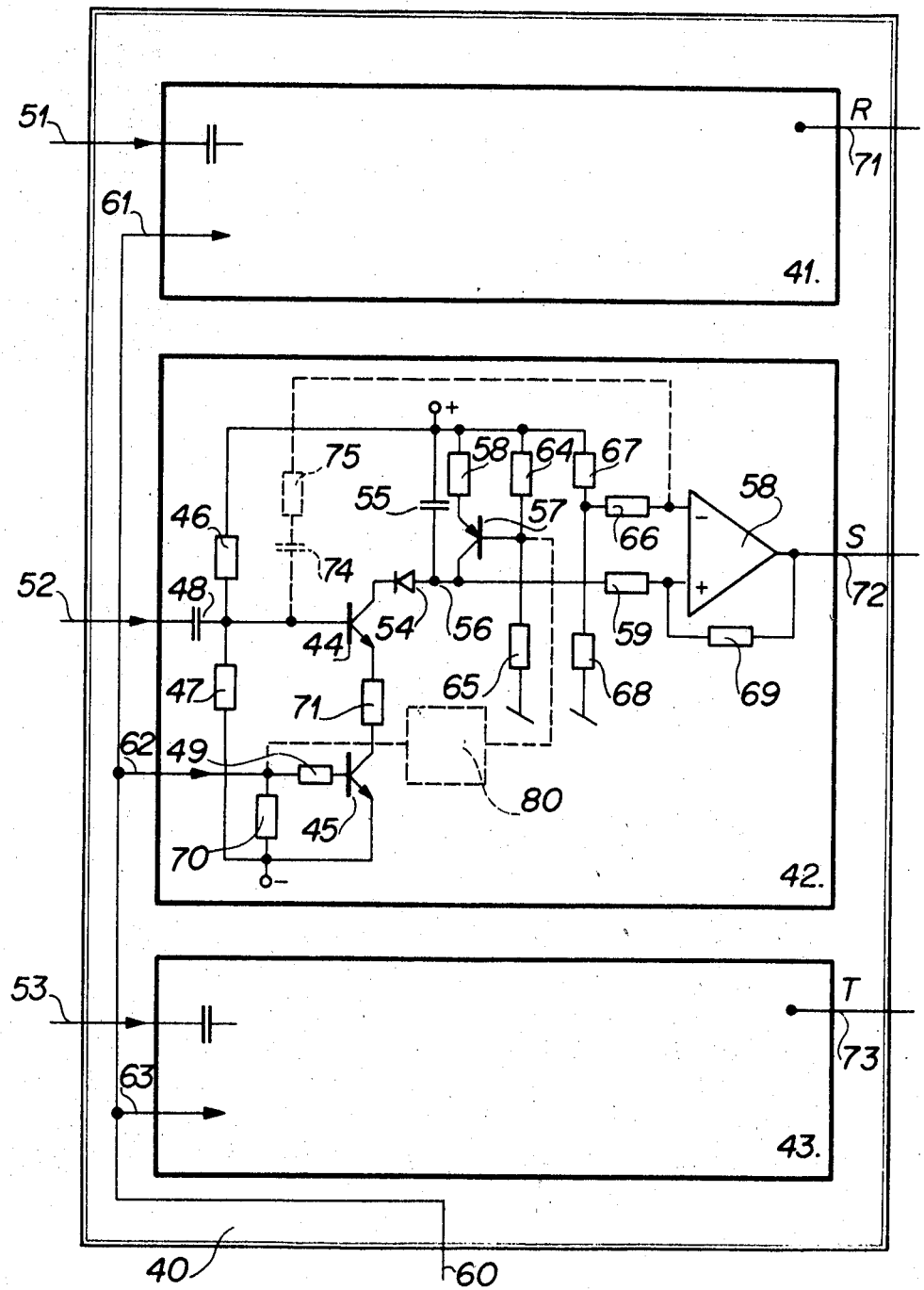
Figure 7:
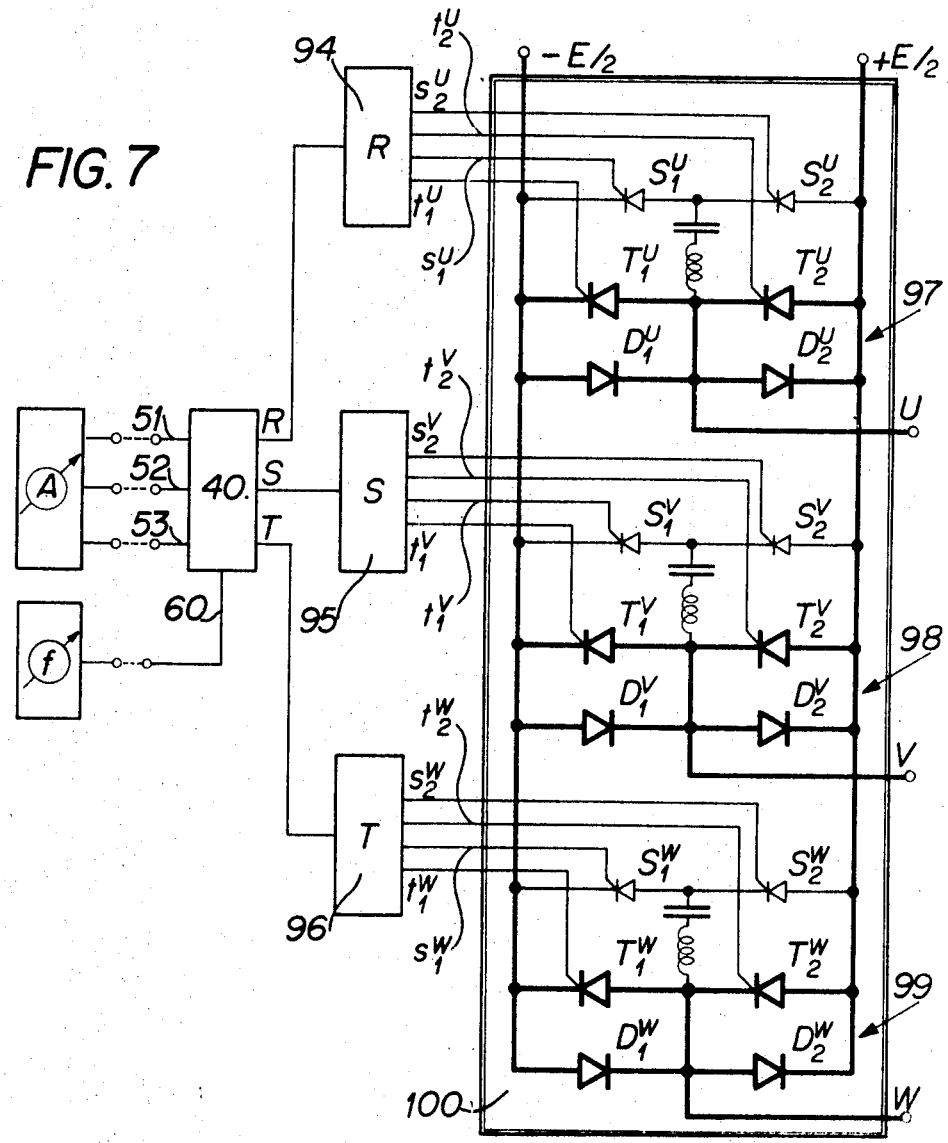
Figure 6:
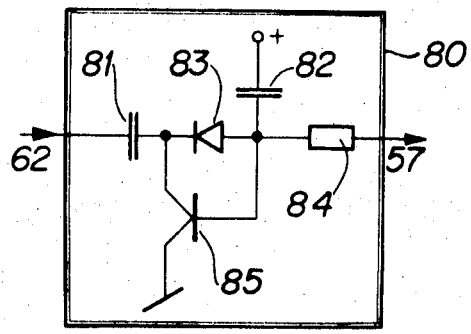
Figure 8:
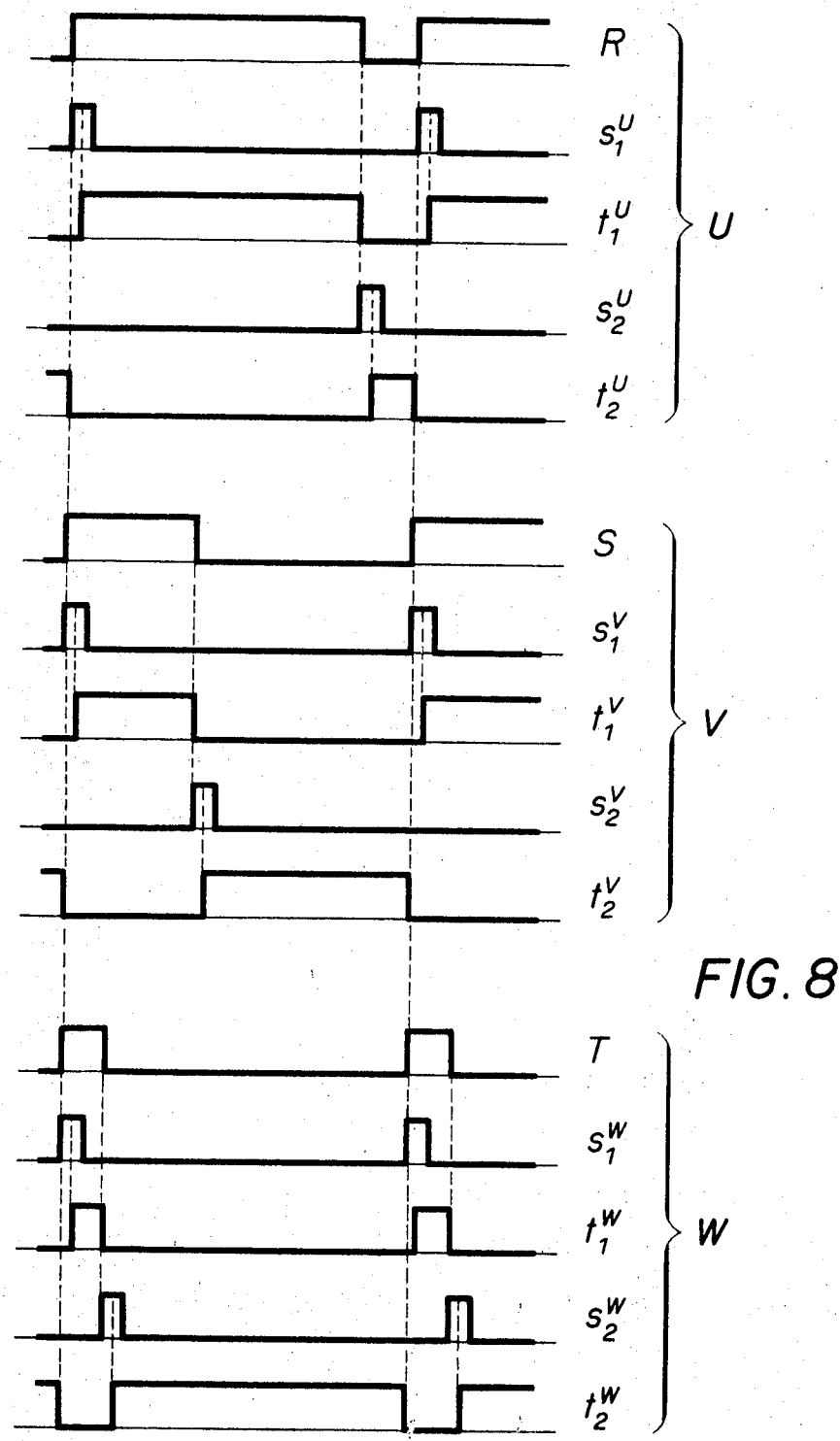

For a better understanding of the invention and to show how the same may be carried into effect, reference will now be made, by way of example, to the accompanying drawings, in which:

FIG. 1 is a set of four diagrams illustrating the method,

FIGS. 2 and 3 are diagrams showing two variants of the performance of the method, FIG. 4 is a diagram illustrating a modification of the method, FIG. 5 is a functional diagram of the apparatus for carrying out the method, FIG. 6 is a functional diagram of an optional auxiliary circuit, FIG. 7 is a diagram showing how the apparatus is connected to an inverter, and FIG. 8 comprises three diagrams, each containing five curves, which show the operation of the apparatus.

The method is illustrated by diagram A of FIG. 1, which represents a sinusoidal voltage wave 1 whose zeros are situated on a line 2, corresponding to the mean voltage of said wave, and whose frequency has a value $f_o$. Measured in relation to a reference level represented by the line 3, the momentary value of this wave is always positive, that is to say, the curve 1 never cuts the line 3. At instants $t_1$, $t_2$, $t_3$, ... which periodically succeed one another at intervals $\tau_e=1/f_e$, the momentary value of the sinusoidal voltage 1 is measured in relation to the reference level 3, this voltage being represented by the lengths $a_1, a_2, a_3, ...$ . A succession of asymmetrical triangular signals $T_1, T_2, T_3, ......$ as shown in diagram B is then generated. These signals have the following characteristics:

their steep edges $b_1, b_2, b_3, ...$ precede their oblique edges $c_1, c_2, c_3, ...$ and coincide with the instants $t_1, t_2, t_3, ...$ , the heights $b_1, b_2, b_3, ...$ of these edges are proportional (or in some cases equal) to the momentary values $a_1, a_2, a_3, ...$ of the sinusoidal voltage 1 measured at the sampling instants $t_1, t_2, t_3, ...$ , and the oblique edges $c_1, c_2, c_3, ...$ have a given slope $p$, which has the same value for each of them.

These triangular signals are converted into rectangular pulses (see diagram C), each of which has a width equal to the period between the steep edge $b_i$ of the corresponding triangular signal $T_i$ and the instant $t'_i$ when the oblique edge $c_i$ of this triangular signal encounters a reference level represented by the line 4 (see diagram B). Thus, the pulse $I_1$ has a width which is equal to the period $d_1$ between the steep edge of the corresponding triangular signal $T_1$ and the instant $t^o{}_1$ when the oblique edge $c_1$ encounters the reference level 4. The same is the case with the rectangular pulse $I_3$, the width of which is equal to the period $d_3$ between the instant $t_3$ when the steep edge of the triangular signal $T_3$ occurs and the instant $t^o{}_3$ when the oblique edge $c_3$ encounters the reference level 4. In other words, the pulses $I_i$ succeed one another periodically at the same frequency $f_e$ as the sampling instants, with which they are therefore synchronous; they are width-modulated in accordance with a law which depends upon the momentary value $a_i$ possessed by the sinusoidal voltage 1 at these instants, since, with a given slope $p$ of the oblique edges $c_i$, the period $d_i$ depends only upon the height $b_i$ of the steep edges of the triangular signals $T_i$ (which height is proportional to the momentary value $a_i$). When the reference level 4 is coincidental with the zero level of these triangular signals, this dependence becomes a proportionality and the width $d_i$ of the pulses is directly proportional to the momentary value of the sinusoidal voltage 1, measured in relation to the level 3. It is these pulses $I_i$ which are employed to control the firing and extinction of the two rectifier elements included in the switching group allocated to one phase of the inverter: one of these rectifier elements is maintained in the fired condition as long as the pulse $I_i$ lasts, and it is extinguished (by forced extinction) during the interval $\tau_e-d_i$, and conversely for the other rectifier element, which is extinguished as long as the pulse $I_i$ lasts and fired during the interval $\tau_e-d_i$. By choosing for the frequency $f_e$ with which the sampling instants succeed one another a value which is slightly higher or lower (higher in the case of FIG. 1) than the frequency $f_o$ of the sinusoidal voltage 1, there is obtained for the width modulation of the pulses $I_i$ a low frequency $f_s=|f_o-f_e|$ which results from the "beat" between the sinusoidal voltage and the succession of the sampling instants. The corresponding phase of the inverter therefore behaves as if it were connected to one of the poles of the source (for example the positive pole) throughout the duration of each of the pulses $I_i$ and to the other pole (the negative pole) during the intervals between them. The law of variation of the mean potential of this phase as a function of time therefore has the form represented by the curve 5 of diagram C, which represents the fundamental component of the momentary potential of this phase. This curve has the same shape as that on which the peaks $E_i$ of the samples of the curve 1 are situated and an amplitude $A_s$ which is proportional thereto. If the amplitude $A_o$ of the sinusoidal voltage wave 1 is varied, the amplitude $A_s$ of the mean potential varies proportionally; if the frequency of the succession of sampling instants is varied about the value $f_o$, the frequency $f_s$ of the mean potential of the phase under consideration varies in the same way.

The same sinusoidal voltage 1 is sampled at other instants which occur in two other series of sampling instants, which series have the same frequency as the first but are staggered from one another by an electrical angle of $2\pi/3$ and an "amplitude-duration" conversion is effected with these other two sampling series in the same way as has just been described. This is what is diagrammatically illustrated in FIG. 2, in which the curve 1 represents the sinusoidal voltage which is sampled at instants belonging to the three series of sampling instants 7, 8 and 9, the "amplitude-duration" conversion being represented by the rectangle 10 and the modulated pulses corresponding to each of the series 7, 8 and 9 being represented by the curves 11, 12 and 13. These rectangular waves, which have low-frequency fundamental components represented by the curves 14, 15 and 16, are utilized to control the rectifier elements associated with the switching groups corresponding to the phases U, V and W respectively of the inverter.

Instead of sampling a single sinusoidal wave 1 at sampling instants occurring in three separate trains 8, 9 and 10 out of phase from one another by an angle $2\pi/3$, it is also possible, as shown in FIG. 3, to employ three sinusoidal waves 21, 22 and 23 which have a common frequency $f_o$, but which are out of phase with one another by an electrical angle of $2\pi/3$, and to sample these three waves simultaneously at sampling instants within a single train 24 of frequency $f_e$. An "amplitude-duration" conversion similar to that described in the foregoing, and represented by the rectangle 25, gives rise to three pulse trains 26, 27 and 28, which are width-modulated at a low frequency $f_s=|f_o-f_e|$. These pulses define the firing instants and periods of the rectifier elements of the switching groups of the inverter and their fundamental components 29, 30 and 31 are those of the potentials of the phases U, V and W. The only difference in this procedure is that the rectangular pulses 26, 27 and 28 are in phase, while in the first procedure the rectangular pulses 11, 12 and 13 are out of phase with one another by $2\pi/3$.

By taking for the sampling frequency $f_e$ a value close to the frequency $f_o$ of the sinusoidal wave or waves, and by varying it slightly, it is possible to vary the frequency of the voltage supplied by the phases U, V and W from zero to a maximum value and even to obtain a "negative" frequency, which corresponds to a reversal of the order of succession of these phases. By varying the amplitude of the sinusoidal wave or waves, there is obtained a variation of the amplitude of the fundamental components 14, 15 and 16 or 29, 30 and 31, that is to say, a variation of the three-phase voltage supplied by the inverter.

It is advantageous to choose the slope $p$, called the "conversion" slope, of the oblique edges $c$ of the triangular signals T (see diagram B of FIG. 1) in such manner that the width $d$ of the pulses I (see diagram C of FIG. 1) is equal to $\tau_e/2$ when the sinusoidal wave 1 has zero amplitude. In this way, the width of the pulses I is symmetrically modulated about a value which is equal to one-half the interval between two consecutive sampling instants.

Consequently, this conversion slope should, strictly speaking, be proportional to the sampling frequency $f_e$ because, with given amplitude, the ratio $d/\tau_e$ should be independent of the frequency. Although a dependence of this kind is not very troublesome in practice, notably when the inverter is called upon to supply a floating-neutral polyphase load, means may be provided to vary the conversion slope $p$ proportionally with the sampling frequency $f_e$.

In fact, the switching instants are always delayed in relation to the sampling instants and the value of this delay is sinusoidally modulated about the value which corresponds to a zero momentary amplitude. Consequently, the commutations are more delayed for the positive half-cycles and less delayed for the negative half-cycles, so that the current supplied by the inverter in each phase is deformed in relation to a pure sinusoid, harmonics being set up. Of these harmonics, only the harmonic of second order has a relatively great amplitude, and this amplitude increases with the frequency. Thus, calculations corroborated by measurements have shown that, with a frequency $f_o$=1,300 c./s., the amplitude of the harmonic of second order can reach up to about 20 percent of the amplitude of the fundamental frequency, the maximum being reached when the latter has a frequency $f_s=|f_o-f_e|$ of 160 c./s. and when the output voltage has its maximum value (corresponding to maximum modulation of the rectangular pulses). Such a harmonic content may be troublesome owing to the heating which it causes and to the losses entailed. In order to obviate this, it is possible to vary the reference level represented by the line 4 of diagram B of FIG. 1, in accordance with a sinusoidal law having the same frequency and the same phase as the sinusoidal wave which is sampled and an amplitude proportional to that of the latter. It is found that the proportion of second harmonics is thereby greatly reduced.

This is illustrated in FIG. 4, which shows, to a larger scale than FIG. 1, one and a quarter cycles of the sinusoidal wave 1 and two samples $E_i$ and $E_{i+1}$ measured at the instants $t_i$ and $t_{i+1}$, and in which it has been assumed that the heights of the steep edges $b_i$ and $b_{i+1}$ of the triangular signals $T_i$ and $T_{i+1}$ are equal to the values $a_i$ and $a_{i+1}$ of the samples. The constant reference level 4, which defines the widths $d_i$, $d_{i+1}$ of the pulses $I_i$, $I_{i+1}$ in FIG. 1, has been replaced by a reference level 4', which varies sinusoidally at the same frequency and with the same phase as the wave 1. The oblique edge $c_i$ of the triangular signal $T_i$ encounters the variable lever 4' at the instant $t^\infty_i$. It is this instant $t^\infty_i$ which defines the width $d'_i$ of the rectangular pulse $I_i$. There is a resultant increase $\Delta d_i$ of the width of the latter in relation to the width $d_i$ defined by the intersection of the oblique edge $c_i$ with the constant reference level 4. This variation $\Delta d_i$ of the width of the pulse $I_i$ depends upon the amplitude of the sinusoid 4' and consequently upon that of the wave 1 to which it is proportional. Everything therefore happens as if there were applied to the phase of this sinusoidal wave 1 a small variation proportional to its amplitude, which variation simulates a phase advance of the reference signal when the positive half-cycle is sampled and a phase delay of this reference signal when the negative half-cycle is sampled.

With regard to the apparatus 40 for carrying out the method just described, it is diagrammatically illustrated in FIG. 5, in the case where use is made of three sinusoidal waves out of phase by $2\pi/3$ with one another, which are sampled at instants belonging to a single train, as explained with reference to FIG. 3.

This apparatus comprises three identical circuits 41, 42 and 43, called driving circuits, each of which is allocated to one of the switching groups of the inverter. Since these driving circuits are identical, only one of them will be described in detail, i.e. the driving circuit 42. This driving circuit comprises the following elements:

a sampling circuit formed of two transistors 44 and 45 connected in cascade, the emitter of the first being connected to the collector of the second through a resistor 71; the base of the transistor 44, of which the mean potential is fixed by the voltage divider consisting of the resistors 46 and 47 connected to the supply terminals "+" and "−", is connected through an input capacitor 48 to a line 52 through which there arrives one of the sinusoidal waves generated by a first external generator (not shown) supplying at least one sinusoidal wave, for example the sinusoidal wave 22 of FIG. 3. This line 52 constitutes one input, called the main input, of the driving circuit 42. The base of the transistor 45 is connected through a resistor 70 to the supply terminal "−" and through a resistor 49 to a line 62 through which there arrive the pulses of a pulse train generated by the second external generator (not shown). This line 62, which supplies at least one train of periodic pulses, constitutes the other input, called the control input, of the driving circuit 42. The emitter of the transistor 45 is connected to the supply terminal "−" and the collector of the transistor 44 is connected through an output diode 54 to the other elements of the driving circuit. These two transistors thus constitute in combination a chopper-amplifier.

A measuring capacitor 55 inserted between the output 56 of the diode 54 and the supply terminal "+."

A constant-current discharge circuit formed of the transistor 57, of its emitter resistor 58 and of the voltage divider 64, 65 feeding its base, this discharge circuit being connected to the terminals of the measuring capacitor 55.

A comparator circuit consisting of an operational amplifier 58 having two inputs, one of which (the input "+") is connected through a resistor 59 to the output 56 of the diode 54, while the other input (the input "−") is connected through a resistor 66 to a fixed positive potential defined by the voltage divider 67, 68 connected between earth and the supply terminal "+." A resistor 69 introduces a negative feedback applied to the input "+" and intended to steepen the edges of the signals supplied by the amplifier 58 at its output 72. This output 72 simultaneously constitutes that of the comparator circuit and that of the driving circuit 42 itself.

All the driving circuits are identical, with their main inputs 51, 52, 53 for the sinusoidal waves, their control inputs 61, 62, 63 for the trains of periodic pulses and their outputs 71, 72, 73, and they operate in the same way.

This operation will now be described.

The sinusoidal wave arriving through the main input 52 is transmitted by the capacitor 48 and is superimposed upon the fixed voltage defined by the divider 46, 47. Therefore, the potential of the base of the transistor 44 oscillates sinusoidally about this fixed voltage, which constitutes the reference level 3 (FIG. 1) in relation to which the momentary value of this sinusoidal wave is defined. At the instant when a pulse is set up at the control input, the transistor 45 is rendered conductive for a brief instant, with the result that the emitter of the transistor 44 is rendered negative. The voltage of the base of the latter is then transferred to its collector, which is thus at the potential possessed at this instant by the sinusoidal wave 1. Consequently, this momentary potential is transferred through the diode 54 to the junction 56, so that the capacitor 55 acquires a charge which is proportional to the momentary value of the sinusoidal wave. From this instant, the capacitor commences to discharge through the constant-current discharge circuit, and the voltage across its terminals decreases proportionally with time. At the same instant, the output 72 of the comparator 58 changes from the state "1," in which it was before the occurrence of the control pulse, to the state "0." The output 72 remains in the state "0" as long as the voltage applied to its input "+" has not fallen back to the value of that which is applied to its input "−", which is defined by the voltage divider 67, 68. Since the voltage applied to the input "+" of the comparator 58 is equal to that existing at the terminal 56 of the measuring capacitor 55, the return of the output 72 to the state "1" takes place only at the instant when the charge of this measuring capacitor has fallen to the value defined by the divider 67, 68, which value consequently constitutes the threshold represented by the line 4 in FIG. 1 (diagram B) and in FIG. 4. Since the capacitor 55 discharges at constant-current owing to the presence of the constant-current discharge circuit 57, 58, the duration of the state " 0" of the output 72 is proportional to the voltage which has been applied to the terminal 56 of the capacitor 55 and therefore to the momentary value possessed, at the instant when the control pulse occurs at the control input 62, by the voltage of the sinusoidal wave applied to the main input 52. The comparator 58 therefore effects an "amplitude-duration" conversion of the momentary value of the sinusoidal wave, the duration of the "0" state of the output 72 being proportional to this momentary value. The triggering threshold represented by the voltage defined by the divider 67, 68 is so chosen that, when the momentary voltage of the sinusoidal wave is zero, the duration of the discharge of the capacitor 55 through the resistor 58 is substantially equal to a half-cycle of the train of control pulses carried by the line 62. The output 72 is therefore a width-modulated rectangular wave, the amplitude of this modulation being proportional to the amplitude of the sinusoidal wave. As will hereinafter be described, this wave is applied to the grid control circuit of the corresponding switching group of the inverter.

It has been seen in the foregoing that the "amplitude-duration" conversion introduces into the width modulation of the rectangular wave set up at the output 72 a certain disturbance due to the presence of the harmonic of second order of the low frequency $f_s=f_0-f_e$ and that, in order to eliminate this harmonic when it proves troublesome, it is desirable to modulate the value of the reference level represented by the line 4 (FIG. 4), in accordance with a sinusoid of the same frequency and the same phase as the sinusoidal wave 1. This modulation of the reference voltage applied to the input "−" of the comparator 58 is obtained with the aid of a correcting circuit, which, because of its optional character, is represented by chain lines in FIG. 5 and which comprises a capacitor 74 followed by a resistor 75. This correcting circuit is connected between the base of the transistor 44 and the input "−" of the comparator 58 and it will be seen that it superimposes upon the voltage defined by the divider 67, 68 a voltage which is a fraction of the voltage of the sinusoidal wave and which possesses the same frequency and the same phase as the latter.

It has also been seen that it may be desirable to vary the slope of the oblique edges (conversion slope) in proportion with the frequency of the train of sampling instants. In this case, each of the driving circuits must be completed by a second correcting circuit. The latter is represented in FIG. 5, in the case of the driving circuit 42, by the block 80, which is represented by chain lines because of its optional character, and which is connected between the control input 62 and the base of the transistor 57 of the constant-current discharge circuit.

This second correcting circuit is shown in detail in FIG. 6. It comprises two capacitors 81 and 82 connected in series with one another through a diode 83. This diode prevents the capacitor 82 from discharging other than through the resistor 84, while a transistor 85 restores at each fresh sampling pulse the initial value of the charge of the capacitor 81 by periodically connecting it to earth. This pulse which is set up at the control input 62 passes through the capacitor 81 and the diode 83 to the capacitor 82 and contributes to charging the latter. Between each of these pulses, the capacitor 82 is discharged, by way of the resistor 84, through the voltage divider 64, 65. Its mean voltage therefore depends upon the repetition rate of the control pulses, and since a fraction of this mean voltage is that which is applied to the base of the transistor 57 of the constant-current discharge circuit, the slope of the discharge curve of this circuit, and therefore the amplitude-duration conversion slope, increases in proportion with this repetition rate of the control pulses, i.e. at the sampling frequency.

As the reader will have noted, the apparatus just described operates "inversely" in relation to the diagrams of FIGS. 1 to 4 in the sense that, instead of effecting a sampling from the bottom upwards, i.e. from levels below the quantities to be sampled, it effects a sampling from the top downwards, i.e. from levels above these quantities. This is due to technological reasons related notably to the nature of the comparator circuit employed, but does not in any way invalidate the explanations given with reference to the method. It is sufficient to imagine that the curves of FIGS. 1 to 4 are inverted symmetrically about their time axes.

The apparatus just described corresponds to the case where are available three sinusoidal waves out of phase by $2\pi/3$ in relation to one another, and where these three sinusoidal waves are simultaneously sampled with the aid of the three driving circuits 41, 42, 43 each allocated to one of them, this sampling taking place at sampling instants included within a single common periodic train materialized by the single train of brief pulses simultaneously applied to the control inputs 61, 62 and 63 of each of the circuits 41, 42 and 43.

In order to apply the variant consisting in sampling a single sinusoidal wave at instants which are included in three separate trains of sampling instants, out of phase with one another by $2\pi/3$, it is sufficient to feed in common, with this single sinusoidal wave, the three main inputs 51, 52 and 53 and to apply individually to the control inputs 61, 62 and 63 the trains of brief pulses materializing these sampling instants.

With regard to the connection of the apparatus 40 to an inverter, it is diagrammatically illustrated in FIG. 7, in the case of a three-phase inverter 100 comprising three switching groups 97, 98 and 99 supplying the phases U, V and W respectively. Each of these switching groups comprises a pair of main controlled rectifier elements $T_1^{(U, V, W, resp.)}$, $T_2^{(U, V, W, resp.)}$ (for example thyristors), a pair of return rectifiers $D_1^{(U, V, W, resp.)}$, $D_2^{(U, V, W, resp.)}$ (for example power diodes) and a pair of controlled extinction rectifier elements $S_1^{(U, V, W, resp.)}$, $S_2^{(U, V, W, resp.)}$ (for example thyristors).

The apparatus 40, the details of which are illustrated in FIG. 5, is connected to the inverter 100 through three control logic circuits 94, 95, 96, each of which is allotted to one of the switching groups 97, 98, 99. These control logic circuits, the configuration of which depends upon the type of inverter chosen, are known and they are not shown in detail here. In the case of the inverter chosen by way of example, these control circuits are so arranged as to produce from the signals R, S and T supplied by the outputs 71, 72 and 73 of the control apparatus 40 the signals $t_1^{(U, V, W)}$, $t_2^{(U, V, W)}$ (FIG. 8), which effect the firing of the main rectifier elements, and the signals $s_1^{(U, V, W)}$, $s_2^{(U, V, W)}$, which effect the firing of the extinction rectifier elements and therefore the extinction of the main rectifier elements. The form of these signals and their succession in time is diagrammatically illustrated in FIG. 8 for each of the switching groups, corresponding to the phases U, V and W of the three-phase voltage supplied by the inverter 100.

I claim:

1. A method of controlling a polyphase inverter intended to supply a polyphase voltage whose frequency and amplitude are adjustable independently of one another, said inverter comprising a number of switching groups equal to the number of phases of said polyphase voltage, and said switching groups comprising rectifier elements whose firing and extinction are cyclically triggered by external control signals, the method comprising a. generating at least one sinusoidal voltage wave whose frequency ($f_o$) is fixed and whose amplitude ($A_o$) can vary between zero and a maximum value, b. sampling this sinusoidal wave by measuring its momentary value at sampling instants which succeed one another within at least one train whose frequency can vary about a value close to the fixed frequency of said sinusoidal wave, this measurement being made in relation to a first fixed reference level which is so chosen that the momentary value of this sinusoidal wave measured in relation to the said level is always different from zero, c. converting this momentary value into a pulse duration by generating a succession of asymmetrical triangular signals whose steep edges precede the oblique edges and coincide with these sampling values, the height of these steep edges being proportional to said momentary value of the said sinusoidal voltage and the slope of these oblique edges having a predetermined value, and by generating rectangular pulses whose height is fixed and whose width is equal to the period elapsing between the appearance of the said steep edge and the instant when the said oblique edge reaches a second reference level, the succession of these pulses constituting a set of rectangular waves which are equAL in number to the switching groups of said inverter, which have the same frequency as said sampling train and which are width-modulated, the variation of this width being proportional to the momentary value of the said sinusoidal voltage, and d. allocating one of said rectangular waves to each of the switching groups of the said inverter, the leading and trailing edges of the pulses of said rectangular waves being utilized to form said control signals, so that the voltage across the terminals of each of said switching groups is a pulsating voltage whose mean value oscillates in accordance with a sinusoidal law, whose frequency is equal to the absolute value of the difference between the fixed frequency of said sinusoidal voltage wave and the variable frequency of the said succession of sampling instants, and the amplitude of which is proportional to the variable amplitude of said sinusoidal voltage wave.

2. A method according to claim 1, wherein a single sinusoidal wave of fixed frequency is generated and is sampled at instants included in a number of separate trains of sampling instants equal in number to the switching groups contained in said inverter, said trains being out of phase in relation to one another by a period equal to the quotient of the interval between two sampling instants of one of these trains by the number of said switching groups.

3. A method according to claim 1, wherein there are generated a number of separate sinusoidal waves equal in number to the switching groups contained in said inverter, said sinusoidal waves all having a common fixed frequency and being out of phase in relation to one another by a duration equal to the quotient of their common period by the number of said switching groups, and wherein these sinusoidal waves are sampled at instants included in a single train of sampling instants.

4. A method according to claim 1, wherein the slope of said oblique edges is given a value such that, when the amplitude of said sinusoidal wave is zero, the width of said rectangular pulses is substantially equal to the half-period of said train of sampling instants.

5. A method according to claim 4, wherein the slope of said oblique edges is given a value proportional to the frequency of the said train of sampling instants.

6. A method according to claim 1, wherein the second reference level is varied in accordance with a sinusoidal law whose frequency and phase are equal to the frequency and phase, respectively, of said sinusoidal wave and whose amplitude is proportional to the amplitude of the said sinusoidal wave.

7. Apparatus for carrying out the method according to claim 1, the apparatus comprising a set of driving circuits equal in number to the phases of said inverter and each of which is allocated to one of the switching groups of said inverter, each of these driving circuits comprising:

a sampling circuit provided with a main input for connection to a first external generator capable of supplying at least one sinusoidal voltage wave whose frequency is fixed and whose amplitude can vary between zero and a maximum value, with a control input for connection to a second external generator capable of supplying at least one train of periodic pulses whose amplitude is fixed and whose frequency can vary about a value equal to the frequency of said sinusoidal voltage wave, and with an output, said sampling circuit comprising a chopper-amplifier whose input is connected at least indirectly to the said main input and, in use, is brought to a fixed voltage constituting said first reference level, whose output is connected through a unidirectional rectifier element to said output, and whose triggering member is connected at least indirectly to the said control input, a measuring capacitor connected between the output of said sampling circuit and a first fixed reference voltage, a constant-rate discharge circuit connected to the terminals of said capacitor, and a comparator circuit provided with two inputs and one output, one of said inputs being connected to the output of the said sampling circuit, and the other input being, in use, brought to a second voltage, having the same polarity as the first and constituting the said second reference value, and this output, which constitutes the output of the said driving circuit, being for connection to a grid control circuit attached to the corresponding switching group of said inverter, the whole arrangement being such that each of the said driving circuits supplies control signals formed of a succession of rectangular pulses, each of which has its positive-going edge coinciding with one of the pulses of the train of pulses supplied by said second generator and a width which, at constant frequency, depends linearly upon the momentary value possessed, at the instant when the pulse corresponding to the said positive-going edge is set up, by the sinusoidal wave supplied by said first generator.

8. Apparatus according to claim 7, wherein, with said first external generator provided with a plurality of independent outputs equal in number to the driving circuits, and supplying at each of them a sinusoidal wave, said sinusoidal waves all having common fixed frequency, and a common variable amplitude, and being out of phase in relation to one another by a quantity equal to their period divided by the number of said waves, the main inputs of each of said driving circuits are individually connected to the outputs of the said first generator and the control inputs of each of said driving circuits are connected to a common control input which is connected to the output of the said second generator, the latter supplying a single train of periodic pulses having a variable frequency.

9. Apparatus according to claim 7, wherein, with said second generator being provided with a plurality of independent outputs, equal in number to said driving circuits, and supplying at each of them a train of periodic pulses, these trains having a common variable frequency and being out of phase in relation to one another by a quantity equal to their period divided by the number of said trains, the main inputs of each of the said driving circuits are connected to a common main input, which is connected to the output of said first generator, the latter supplying a single sinusoidal wave having a fixed frequency and a variable amplitude, and said control inputs of each of said driving circuits are individually connected to the separate outputs of said second generator.

10. Apparatus according to claim 7, wherein each of the said driving circuits comprises a first correcting circuit which is connected between said sampling circuit and said comparator circuit and which is so arranged as to extract a portion of the signal applied to the main input of the said sampling circuit and to apply it to that one of the inputs of the said comparator circuit which is connected to said second voltage, so as to impart to the voltage applied to the said input an oscillation having the same frequency and the same phase as the said sinusoidal wave, and an amplitude proportional to that of the latter.

11. Apparatus according to claim 7, wherein each of the said driving circuits comprises a second correcting circuit which is connected between said control input and said constant-rate discharge circuit and which is so arranged as to produce from the signal applied to said control input a voltage representing the frequency of said train of periodic pulses, and to modify, with the aid of said voltage, the impedance of said discharge circuit, so that, with constant amplitude of said sinusoidal wave, the width of said rectangular pulses is inversely proportional to the frequency of said train of periodic pulses.